(12) United States Patent
Searcy

(10) Patent No.: US 11,148,543 B2
(45) Date of Patent: Oct. 19, 2021

(54) CAR WINDSHIELD AUXILIARY BATTERY APPARATUS

(71) Applicant: Teodore R. Searcy, Dayton, OH (US)

(72) Inventor: Teodore R. Searcy, Dayton, OH (US)

( * ) Notice: Subject to any disclaimer, the term of this patent is extended or adjusted under 35 U.S.C. 154(b) by 174 days.

(21) Appl. No.: 16/728,410

(22) Filed: Dec. 27, 2019

(65) Prior Publication Data
US 2021/0197687 A1    Jul. 1, 2021

(51) Int. Cl.
| | | |
|---|---|---|
| *B60L 53/55* | (2019.01) | |
| *B60J 1/20* | (2006.01) | |
| *B60L 50/40* | (2019.01) | |

(52) U.S. Cl.
CPC ............... *B60L 53/55* (2019.02); *B60J 1/20* (2013.01); *B60L 50/40* (2019.02)

(58) Field of Classification Search
CPC .............. B60L 53/55; B60L 50/40; B60J 1/20
See application file for complete search history.

(56) References Cited

U.S. PATENT DOCUMENTS

| 5,602,457 A | * | 2/1997 | Anderson | ......... B32B 17/10036 |
| | | | | 320/102 |
| D620,856 S | | 8/2010 | Kaoud | |
| 8,418,477 B2 | | 4/2013 | Klein | |
| 9,871,392 B2 | | 1/2018 | Durando | |
| 2006/0290521 A1 | | 12/2006 | Sun | |
| 2008/0072949 A1 | | 3/2008 | Rowell | |
| 2019/0173305 A1 | | 6/2019 | Nook | |

FOREIGN PATENT DOCUMENTS

WO    WO2008036114    3/2008

* cited by examiner

*Primary Examiner* — Carlos Amaya

(57) ABSTRACT

A car windshield auxiliary battery apparatus for storing reserve power to start a vehicle includes a pair of capacitor plates configured to be coupled within a windshield of a vehicle. The pair of capacitor plates lies in parallel planes and comprises a first plate and a second plate configured to be in operational communication with a positive terminal and a negative terminal of a vehicle battery, respectively. A dielectric material is coupled between the pair of capacitor plates. A switch is configured to be coupled within the vehicle and is in operational communication with the pair of capacitor plates and the vehicle battery to interrupt or allow power flow therebetween.

9 Claims, 4 Drawing Sheets

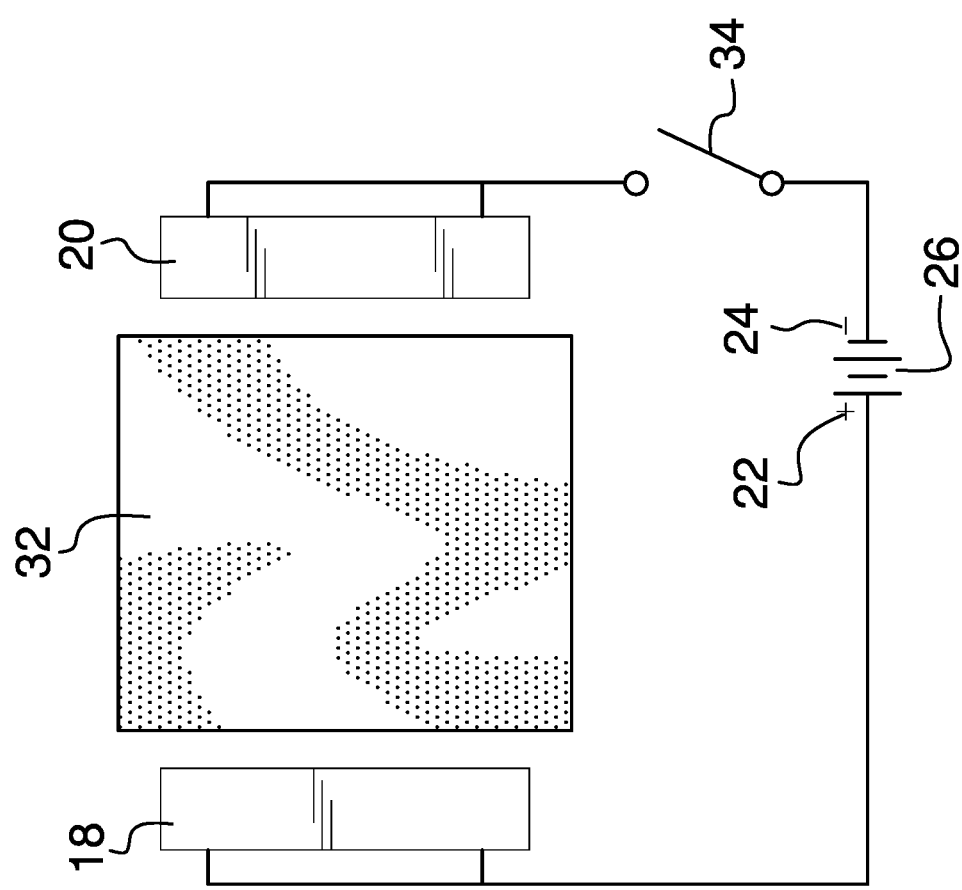

CAR WINDSHIELD AUXILIARY BATTERY APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to automotive assistive devices and more particularly pertains to a new automotive assistive device for storing reserve power to start a vehicle.

(2) Description of Related Art Including Information Disclosed Under 37 CFR 1.97 and 1.98

The prior art relates to automotive assistive devices, particularly devices for powering accessories and charging batteries. Most devices utilize photovoltaic cells to create a power to charge an existing vehicle battery or a secondary battery in the vehicle. Existing devices do not utilize a DC power source to store a charge in a discrete dielectric capacitor.

BRIEF SUMMARY OF THE INVENTION

An embodiment of the disclosure meets the needs presented above by generally comprising a pair of capacitor plates configured to be coupled within a windshield of a vehicle. The pair of capacitor plates lies in parallel planes and comprises a first plate and a second plate configured to be in operational communication with a positive terminal and a negative terminal of a vehicle battery, respectively. A dielectric material is coupled between the pair of capacitor plates. A switch is configured to be coupled within the vehicle and is in operational communication with the pair of capacitor plates and the vehicle battery to interrupt or allow power flow therebetween.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 4 is a circuit diagram view of an embodiment of the disclosure.

DETAILED DESCRIPTION OF THE INVENTION

Figure 1:
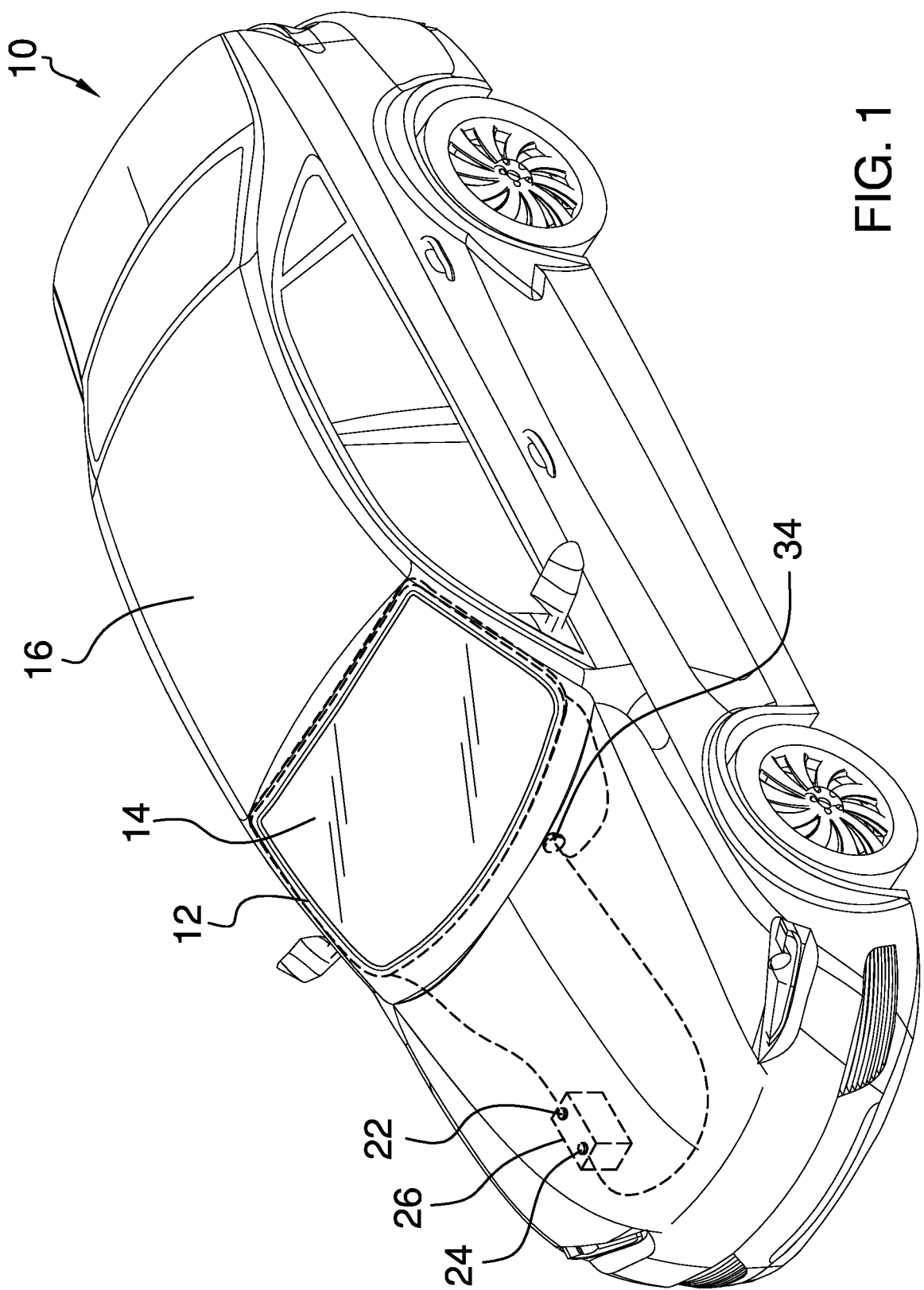
FIG. 1 is an in-use view of a car windshield auxiliary battery apparatus according to an embodiment of the disclosure.
Figure 2:
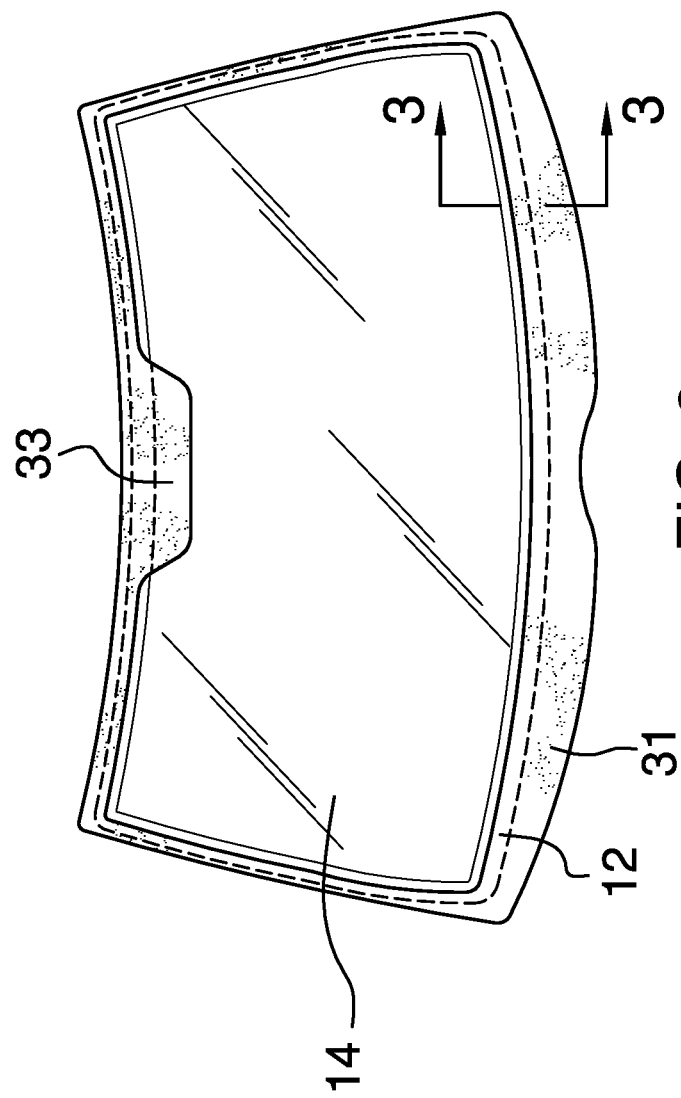
FIG. 2 is a front elevation view of an embodiment of the disclosure.
Figure 3:
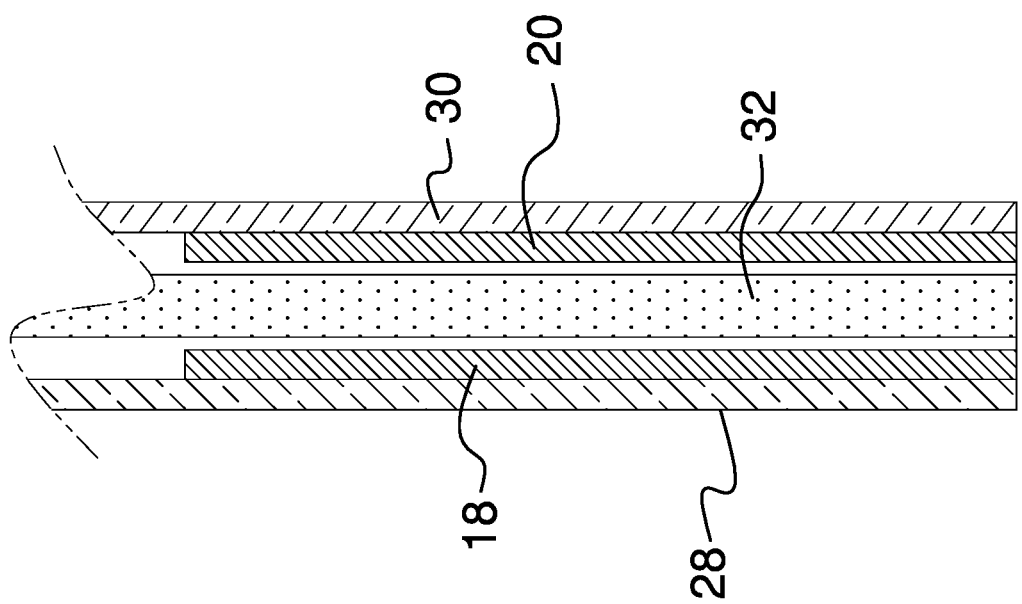
FIG. 3 is a cross-sectional view of an embodiment of the disclosure.

With reference now to the drawings, and in particular to FIGS. 1 through 4 thereof, a new automotive assistive device embodying the principles and concepts of an embodiment of the disclosure and generally designated by the reference numeral 10 will be described.

As best illustrated in FIGS. 1 through 4, the car windshield auxiliary battery apparatus 10 generally comprises a pair of capacitor plates 12 configured to be coupled within a windshield 14 of a vehicle 16. Each capacitor plate 12 may be a frame shape conforming to the shape of the windshield 16. The pair of capacitor plates 12 lies in parallel planes and comprises a first plate 18 and a second plate 20 configured to be in operational communication with a positive terminal 22 and a negative terminal 24 of a vehicle battery 26, respectively. The first plate 18 and the second plate 20 may be coupled adjacent a front pane 28 and a rear pane 30 of the windshield, respectively. The capacitor plates 12 may be coupled within a non-transparent portion 31 of the windshield around the perimeter thereof so as to not interfere with a driver's field of vision while operating the vehicle 16. The non-transparent portion 31 may include a medial extension 33 to protect the user's eyes from glare when looking at the rear view mirror. The medial extension 33 may be a rounded trapezoidal shape.

A dielectric material 32 is coupled between the pair of capacitor plates 12. The dielectric material 32 may be medially positioned between, and spaced apart from, the pair of capacitor plates 12. A thickness of the diametric material 32 may be at least twice a thickness of each capacitor plate 12. As current is sent from the vehicle battery 26 through the apparatus 10, the first plate 18 and the second plate 20 charge up until the voltage drop therebetween is equal to that of the vehicle battery 26. The amount of capacitance is equal to a dielectric constant of the dielectric material 32 multiplied by the area of each capacitor plate 12 and divided by the product of 4.45 and the distance between the first plate 18 and the second plate 20. The dielectric material 32 may have a dielectric constant of at least 100 to improve the total capacitance of the apparatus 10. The dielectric material 32 may be, but is not limited to, ceramic, titanium dioxide compounds, and the like.

A switch 34 is configured to be coupled within the vehicle 16. The switch 34 may be positioned in an easily accessible location from a driver's seat of the vehicle 16 so as to be controlled while starting the vehicle 16. The switch 34 may be, but is not limited to, a button, a toggle switch, a lever, and the like. The switch 34 is in operational communication with the pair of capacitor plates 12 and the vehicle battery 26 to interrupt or allow power flow therebetween.

In use, the switch 34 is activated to allow current to flow to the apparatus 10 while the vehicle 16 is running. The pair of capacitor plates 12 charges up until the maximum capacitance has been reached and the switch 34 may then be deactivated. A status indicator such as a light, a dial, or a screen may be in operational communication with the pair of capacitor plates 12 and installed within the vehicle 16 to show the user the charge level. Should the vehicle battery 26 lose enough charge that the vehicle 16 will not start, the user can then reactivate the switch 34 so that the stored energy in the pair of capacitor plates 12 can be used by the vehicle battery 26, eliminating the need for jumper cables or roadside assistance.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A car windshield auxiliary battery apparatus comprising:
    a pair of capacitor plates configured to be coupled within a windshield of a vehicle, the pair of capacitor plates lying in parallel planes, the pair of capacitor plates comprising a first plate and a second plate configured to be in operational communication with a positive terminal and a negative terminal of a vehicle battery, respectively;
    a dielectric material coupled between the pair of capacitor plates; and
    a switch configured to be coupled within the vehicle, the switch being in operational communication with the pair of capacitor plates and the vehicle battery to interrupt or allow power flow therebetween.

2. The car windshield auxiliary battery apparatus of claim 1 further comprising each capacitor plate being a frame shape conforming to the shape of the windshield of the vehicle.

3. The car windshield auxiliary battery apparatus of claim 1 further comprising the first plate and the second plate being coupled adjacent a front pane and a rear pane of the windshield, respectively.

4. The car windshield auxiliary battery apparatus of claim 1 further comprising the dielectric material being medially positioned between, and spaced apart from, the pair of capacitor plates.

5. The car windshield auxiliary battery apparatus of claim 1 further comprising a thickness of the diametric material being at least twice a thickness of each capacitor plate.

6. The car windshield auxiliary battery apparatus of claim 1 further comprising the dielectric material having a dielectric constant of at least 100.

7. A car windshield auxiliary battery apparatus comprising:
    a pair of capacitor plates configured to be coupled within a windshield of a vehicle, each capacitor plate being a frame shape conforming to the shape of the windshield, the pair of capacitor plates lying in parallel planes, the pair of capacitor plates comprising a first plate and a second plate configured to be in operational communication with a positive terminal and a negative terminal of a vehicle battery, respectively, the first plate and the second plate being coupled adjacent a front pane and a rear pane of the windshield, respectively;
    a dielectric material coupled between the pair of capacitor plates, the dielectric material being medially positioned between, and spaced apart from, the pair of capacitor plates; and
    a switch configured to be coupled within the vehicle, the switch being in operational communication with the pair of capacitor plates and the vehicle battery to interrupt or allow power flow therebetween.

8. The car windshield auxiliary battery apparatus of claim 7 further comprising a thickness of the diametric material being at least twice a thickness of each capacitor plate.

9. The car windshield auxiliary battery apparatus of claim 7 further comprising the dielectric material having a dielectric constant of at least 100.

* * * * *